United States Patent
Cohen (10) Patent No.: US 9,546,461 B2
(45) Date of Patent: Jan. 17, 2017

(54) SNOW THROWER INCLUDING REVERSE SHUT-OFF MECHANISM

(71) Applicant: Snow Joe, LLC, Edison, NJ (US)

(72) Inventor: Joseph S Cohen, Edison, NJ (US)

(73) Assignee: SNOW JOE, LLC, Edison, NJ (US)

( * ) Notice: Subject to any disclaimer, the term of this patent is extended or adjusted under 35 U.S.C. 154(b) by 0 days.

(21) Appl. No.: 14/519,930

(22) Filed: Oct. 21, 2014

(65) Prior Publication Data

US 2016/0108593 A1    Apr. 21, 2016

(51) Int. Cl.
 *E01H 5/09*    (2006.01)
 *B60K 28/00*   (2006.01)

(52) U.S. Cl.
 CPC ............. *E01H 5/098* (2013.01); *B60K 28/00* (2013.01)

(58) Field of Classification Search
 CPC ............ E01H 5/04; E01H 5/045; E01H 5/098; B60K 28/00; B60K 28/10; B60K 2028/006
 See application file for complete search history.

(56) References Cited

U.S. PATENT DOCUMENTS

| | | | | |
|---|---|---|---|---|
| 4,255,879 A * | 3/1981 | Greider | ............... | B60K 28/04 172/42 |
| 4,346,526 A * | 8/1982 | Mattson | ............... | E01H 5/045 37/259 |
| 5,398,431 A * | 3/1995 | Beihoffer | ............. | E01H 5/098 37/247 |
| 5,524,034 A | 6/1996 | Srygley et al. | | |
| 5,601,512 A * | 2/1997 | Scag | ............... | B60K 28/10 477/111 |
| 5,603,173 A * | 2/1997 | Brazell | ............... | E01H 5/04 37/244 |
| 6,035,561 A | 3/2000 | Paytas et al. | | |
| 6,105,348 A | 8/2000 | Turk et al. | | |
| 6,109,010 A * | 8/2000 | Heal | ............... | B60K 28/10 56/10.5 |
| 6,170,179 B1 * | 1/2001 | Paytas | ............... | E01H 5/045 180/68.5 |

(Continued)

FOREIGN PATENT DOCUMENTS

JP    2008007980 A    1/2008

OTHER PUBLICATIONS

ION18SB—Snow Joe 40-Volt Cordless, Battery-Powered Snow Blower—Live Demo "Cut the Cord" by Snow Joe + Sun Joe. Apr. 12, 2014 (Apr. 12, 2014) [online], [retrieved on Nov. 25, 2015]. Retrieved from the internet: <https://www.youtube.com/watch?v=wzDU-iTPIXk>.

*Primary Examiner* — Jamie L McGowan
(74) *Attorney, Agent, or Firm* — Seyfarth Shaw LLP; Ilan N. Barzilay; Joseph M. Walker (57) ABSTRACT

A snow thrower having a reverse shut-off mechanism configured to deactivate voltage supplied from a power source to a motor that rotates an auger assembly. The reverse shut-off mechanism deactivates the voltage supplied in response to the snow thrower being moved or rolled in a reverse direction. Upon movement of the snow thrower in a forwards direction to clear snow or other debris, the shut-off mechanism reactivates voltage supplied from the power source to the motor that rotates the auger assembly. This allows the snow thrower to conserve power and/or fuel when the snow thrower is not being used to clear snow or other debris.

18 Claims, 7 Drawing Sheets

(56) References Cited

U.S. PATENT DOCUMENTS

| | | | |
|---|---|---|---|
| 6,756,750 B2 * | 6/2004 | Wakitani | B60L 7/003 180/19.2 |
| 6,880,686 B1 * | 4/2005 | Hauser | A01D 34/64 192/12 R |
| 7,017,326 B1 | 3/2006 | Keller et al. | |
| 7,126,237 B2 * | 10/2006 | Walters | A01D 34/828 307/9.1 |
| 7,266,938 B1 * | 9/2007 | Hauser | A01D 34/64 56/10.2 R |
| 7,984,662 B1 * | 7/2011 | Hauser | B60K 17/10 56/10.2 R |
| 8,122,619 B2 * | 2/2012 | Embry | E01H 5/04 37/196 |
| 9,272,751 B2 * | 3/2016 | Searles | B62M 6/50 |
| 2006/0059879 A1 * | 3/2006 | Edmond | A01D 34/006 56/6 |
| 2006/0070265 A1 * | 4/2006 | Cohen | E01H 5/04 37/246 |
| 2010/0037491 A1 * | 2/2010 | Parker | E01H 5/106 37/197 |
| 2011/0094129 A1 * | 4/2011 | Rowe | E01H 5/045 37/246 |
| 2015/0007462 A1 * | 1/2015 | Cohen | E01H 5/045 37/242 |

* cited by examiner

SNOW THROWER INCLUDING REVERSE SHUT-OFF MECHANISM

FIELD

The present disclosure relates to devices for removing snow and other debris from driveways, sidewalks, decks, and other areas.

BACKGROUND

In general, during the winter months certain geographic areas experience colder temperatures and snowfall. During and after periods of snowfall, driveways, sidewalks, decks, and other areas may be coated or covered with varying amounts of snow and ice. Currently there are a number of snow throwers that can be used to remove snow and ice from surfaces. However, most snow throwers have a gasoline powered motor, which requires certain maintenance and procedures to be performed if the snow thrower is to be stored for long periods of time. For example, oil may need to be changed and/or drained, and any gasoline remaining in the gas tank of the snow thrower may need to be removed or stabilized prior to storage.

SUMMARY

This disclosure relates to a snow thrower having a shut-off mechanism operably coupled to a wheel or wheel axle of the snow thrower. The shut-off mechanism is configured to automatically turn off or deactivate power to an auger assembly of the snow thrower when the snow thrower rolls in a backwards direction. However, upon movement of the snow thrower in a forwards direction to clear snow or other debris, the shut-off mechanism reactivates power to the auger assembly. This allows for the snow thrower to conserve battery power, electricity, and/or fuel when the snow thrower is not being used to clear snow or other debris.

In an embodiment, a snow thrower is disclosed including a frame, a main housing coupled to the frame and having an inlet cavity, an auger assembly disposed in the main housing and extending across the inlet cavity, a motor disposed in the main housing and coupled to the auger assembly to rotate the auger assembly, a wheel assembly coupled to the frame and including an axle and wheels coupled to ends of the axle for rolling the snow thrower, and a shut-off mechanism coupled to the wheel assembly and adapted to deactivate power to the motor in response to the snow thrower being rolled in a reverse direction.

Power may be supplied to the motor via battery, and the shut-off mechanism is adapted to interrupt and deactivate voltage flow from the battery to the motor in response to the wheel assembly being rotated in the reverse direction. The shut-off mechanism may also be adapted to reactivate the voltage flow from the battery to the motor in response to the wheel assembly being rotated in a forward direction.

In another embodiment, a snow thrower is disclosed including a frame, a main housing coupled to the frame and having an inlet cavity, an auger assembly disposed in the main housing and extending across the inlet cavity, a motor disposed in the main housing and coupled to the auger assembly to rotate the auger assembly, a wheel assembly coupled to the frame and including an axle and wheels coupled to ends of the axle for rolling the snow thrower, and a shut-off mechanism coupled to the wheel assembly.

The shut-off mechanism may include a counter adapted to count a number of rotations of the wheels in the reverse direction, and a switch adapted to deactivate power to the motor in response to the number or rotations meeting or exceeding a threshold value. The threshold value may be at least two. Further, the switch may be adapted to reactivate the power to the motor in response to the wheels being rotated in a forward direction.

In another embodiment, a method of making a snow thrower in disclosed including coupling a shut-off mechanism to a wheel axle of a snow thrower, electrically coupling the shut-off mechanism between a power source and a motor adapted to rotate an auger assembly of the snow thrower, and allowing the shut-off mechanism to interrupt and deactivate power to the motor in response to the wheel axle rotating in a reverse direction. The shut-off mechanism may interrupt and deactivate the power to the motor in response to the wheel axle rotating at least two revolutions in the reverse direction.

The shut-off mechanism may also allow for the reactivation of the power to the motor in response to the wheel axle rotating in a forward direction. The shut-off mechanism may reactivate the power to the motor in response to the wheel axle rotating at least one revolution in a forward direction.

BRIEF DESCRIPTION OF THE DRAWINGS

An embodiment of a cordless snow thrower is illustrated in the figures of the accompanying drawings which are meant to be exemplary and not limiting, in which like references are intended to refer to like or corresponding parts, and in which.

DETAILED DESCRIPTION

Detailed embodiments of snow throwers for removing snow and other debris from driveways, sidewalks, decks, and other areas are disclosed herein, however, it is to be understood that the disclosed embodiments are merely exemplary of the device, which may be embodied in various forms. Therefore, specific functional details disclosed herein are not to be interpreted as limiting, but merely as a basis for the claims and as a representative basis for teaching one skilled in the art to variously employ the present disclosure.

A snow thrower is disclosed having a reverse shut-off mechanism operably coupled to a wheel or wheel axle of the snow thrower. The shut-off mechanism is configured to automatically turn off or deactivate power to an auger assembly of the snow thrower when the snow thrower rolls in a backwards direction. However, upon movement of the snow thrower in a forwards direction to clear snow or other debris, the shut-off mechanism reactivates power to the auger assembly. This allows for the snow thrower to conserve battery power, electricity, and/or fuel when the snow thrower is not being used to clear snow or other debris.

As illustrated and described, the snow thrower is a cordless snow thrower; however, it should be appreciated that the reverse shut-off mechanism may be implemented in any type of snow thrower, including a gas or other fuel operated snow thrower.

Figure 3:
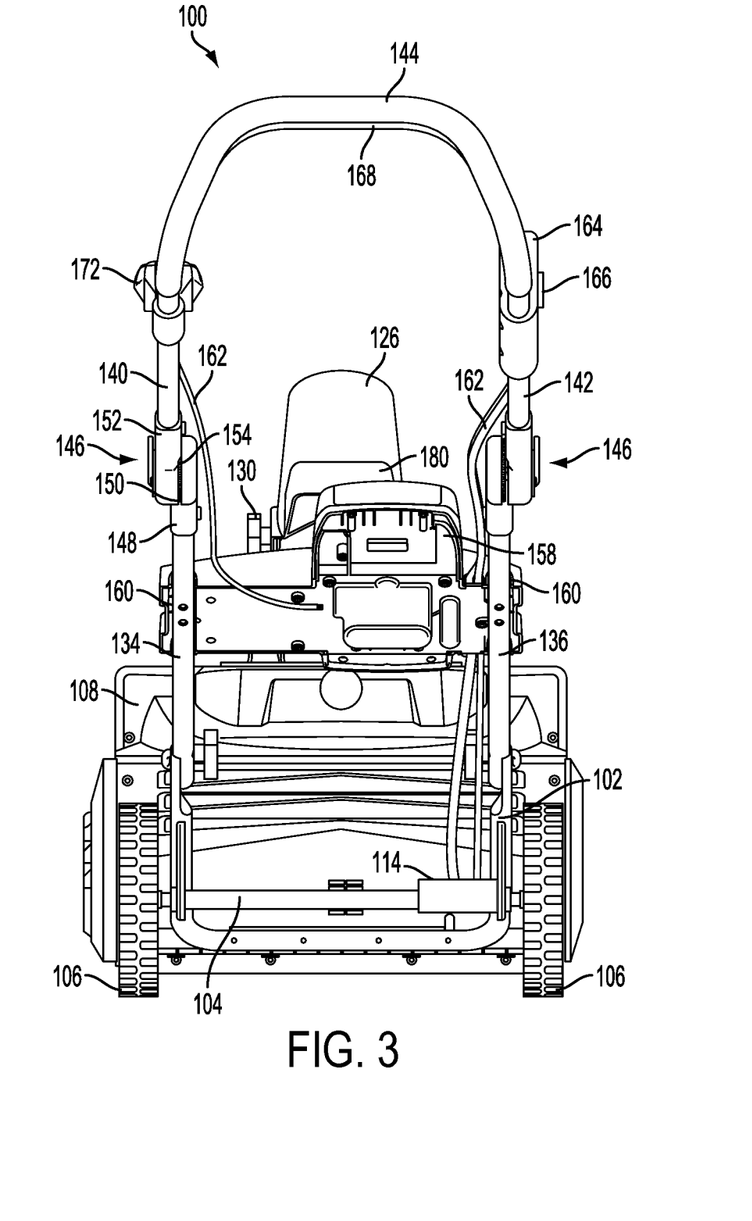
FIG. 3 illustrates a second-side elevation view of the cordless snow thrower.
Figure 6:
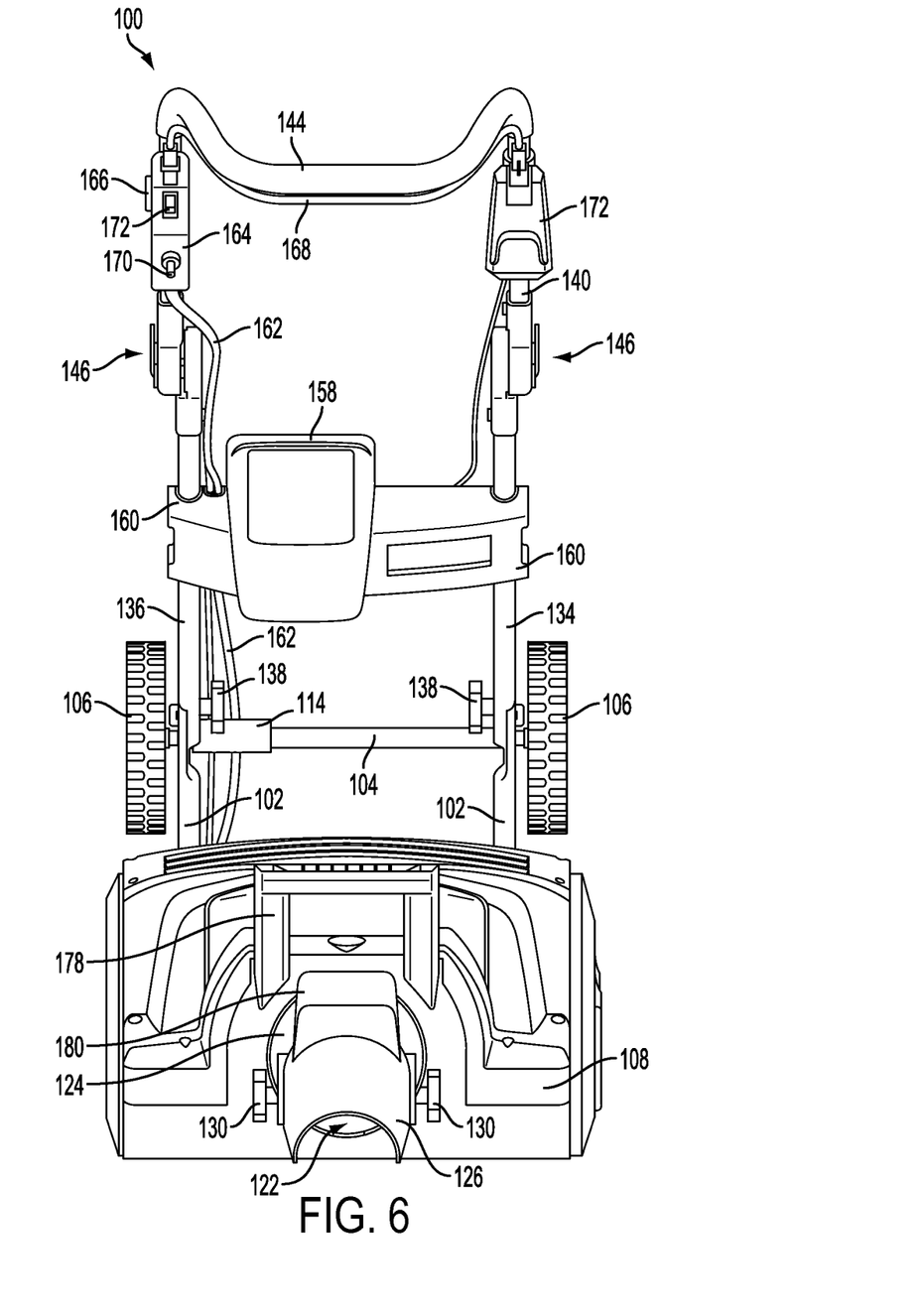
FIG. 6 illustrates a fifth-side elevation view of the cordless snow thrower.

A cordless snow thrower 100 according to an illustrative embodiment is described with reference to FIGS. 1-6. As illustrated, the cordless snow thrower 100 includes a frame 102 having a wheel axle 104 (as illustrated in FIGS. 3 and 6) coupled to the frame. The wheel axle 104 rotates with respect to the frame 102 and wheels 106 are coupled to opposite ends of the wheel axle 104 using means known in the art, for example, threaded nuts, cotter pins and other known means.

A main housing 108 is also coupled to the frame 102. In an illustrative embodiment, the main housing 108 houses an electric motor and a rotor or auger assembly (illustrated in FIGS. 1 and 2). The auger assembly may include a rotor shaft 110 that extends across the main housing 108. The rotor shaft 110 is coupled at a first end to the electric motor and rotated by the electric motor. A second end of the rotor shaft 110 may be rotatably coupled to the main housing 108 or a bracket of the main housing 108, by one or more bearings. One or more blades 112 are coupled to the rotor shaft 110 for cutting through and directing snow through the cordless snow thrower 100. As illustrated there are four (4) blades 112, however, more than four or less than four blades may be used.

The electric motor may be a brushless DC motor or other type of motor capable of rotating the rotor or auger assembly. The one or more blades 112 may be made of any suitable material, for example, steel or other metal, plastic or polymers, and other materials. In an illustrative embodiment, the one or more blades 112 may include a rubber-coating or other flexible material coating on tips of the blades 112 to reduce damage to a surface being cleared of snow or other debris.

Referring to FIG. 3, the cordless snow thrower 100 also includes a shut-off mechanism 114 (illustrated in FIGS. 3 and 6) operably coupled to a wheel 106 and/or the wheel axle 104 of the cordless snow thrower 100. The shut-off mechanism 114 is configured to automatically turn off the auger assembly, by turning off a supply of power to the electric motor coupled to the rotor shaft 110 when the cordless snow thrower 100 rolls in a backwards direction. This allows for the cordless snow thrower 100 to conserve battery power when the cordless snow thrower 100 is not being used to clear snow or other debris.

The shut-off mechanism 114 may include a counter component that counts the number of rotations or revolutions of the wheel axle 104 and/or the wheels 106 in the backwards or reverse direction. The shut-off mechanism 114 may include a switch that turns off the power to the electric motor coupled to the rotor shaft 110 when the number or rotations meets or exceeds a threshold value, for example, one, two, three, four, five, etc. number of rotations. It should be appreciated that the threshold value may be set at any number sufficient to cause the shut-off mechanism 114 to turn off power to the electric motor coupled to the rotor shaft 110 when the cordless snow thrower 100 is being rolled backwards.

The shut-off mechanism 114, for example, the switch, may also be configured to turn the power to the electric motor coupled to the rotor shaft 110 back on when the cordless snow thrower 100 is being rolled in a forward direction and/or being used to clear snow or other debris. In this aspect, the shut-off mechanism 114 may detect when the wheel axle 104 and/or the wheels 106 is being rotated in the forwards direction and upon detecting such rotation allow power to be supplied to the electric motor coupled to the rotor shaft 110.

As illustrated, the main housing 108 includes an inlet cavity 116 having an inlet opening 118 for receiving snow and other debris to be cleared. In one embodiment, the inlet opening 118 may be about 18 inches in length in a horizontal direction and about 10 inches in length in a vertical direction. In other embodiments, the dimensions of the inlet opening 118 may be large or smaller. The inlet cavity 116 is designed to direct snow and other debris toward an outlet chute 120 coupled to the housing. The one or more blades 112 of the auger assembly are located in the inlet cavity 116 and cut and throw the snow and other debris out of the chute 120. In an illustrative embodiment, snow and other debris is thrown out of the chute 120 up to about 20 feet, however, the snow and other debris may be thrown more or less than 20 feet.

In an illustrative embodiment, the housing includes an outlet opening 122 (as illustrated in FIG. 6) disposed on a top portion of the main housing 108. The chute 120 is disposed over the outlet opening 122 and directs the snow and other debris being thrown out of the main housing 108. As illustrated, the chute 120 includes a substantially cylindrical and hollow tube portion 124 that is coupled to the main housing 108 and a substantially semi-circular tube portion 126 that is coupled to the substantially cylindrical tube portion 124 at an end opposite the main housing 108.

The substantially cylindrical tube portion 124 rotates with respect to the main housing 108 around a vertical axis extending through a center of the substantially cylindrical tube portion 124. In an embodiment, the substantially cylindrical tube portion 124 rotates about 180 degrees; however, in other embodiments, the substantially cylindrical tube portion 124 may rotate more or less than 180 degrees. The substantially semi-circular tube portion 126 rotates with respect to the substantially cylindrical tube portion 124 around an axis substantially perpendicular to the vertical axis.

In an illustrative embodiment, the substantially semi-circular tube portion 126 includes one or more teeth that mate with corresponding teeth on the substantially cylindrical tube portion 124 at an attachment point 128 or point of coupling of the substantially semi-circular tube portion 126 with the substantially cylindrical tube portion 124. The teeth allow the substantially semi-circular tube portion 126 to be positioned at varying angles with respect to the substantially cylindrical tube portion 124 by loosening and tightening fasteners 130.

In an illustrative embodiment, a handle portion 132 is coupled to the frame portion 102 at an end opposite the main housing 108 and extends in a direction substantially away from the main housing 108. As illustrated, the handle portion 132 includes a first member 134 and a second member 136 that are coupled to the frame portion 102 by fasteners 138, which may be for example, nuts and bolts, cotter pins, screws, or other known fasteners. As illustrated, the fasteners 138 are substantially "J" shaped. This coupling of the handle portion 132 to the frame portion 102 may allow a user of the cordless snow thrower 100 to uncouple the handle portion 132 from the frame portion 102 or rotate the handle portion 132 for storing or transporting the cordless snow thrower 100 when not in use.

The handle portion 132 may also include first and second extension portions 140 and 142, respectively. The first extension portion 140 is coupled to the first member 134 opposite the frame portion 102, and the second extension portion 142 is coupled to the second member 136 opposite the frame portion 102.

A gripping portion 144 may also be coupled to an end of the handle portion 132 opposite the frame portion 102. As illustrated, the gripping portion 144 is coupled to ends of the first and second extension portions 140 and 142, respectively, opposite the first and second members 134 and 136, respectively. The gripping portion 144 extends between and connects the first and second extension portions 140 and 142, respectively. The gripping portion 144 may be ergonomically shaped to provide a comfortable operating point for an operator or user of the cordless snow thrower 100.

One or more angular adjustments 146 may also be positioned between the gripping portion 144 and the point of coupling of the handle portion 132 to the frame portion 102 to allow a user to adjust the angular position of the first and second extension portions 140 and 142, respectively, and the gripping portion 144.

In an illustrative embodiment, there are two angular adjustments 146, one corresponding to the first member 134 of the handle portion 132 and another corresponding to the second member 136 of the handle portion 132. Only one of the angular adjustments is described below, however it should be understood that the other angular adjustment is substantially similar and merely couples to the second member 136.

As illustrated, the angular adjustment 146 includes a first portion 148 coupled to the first member 134 having first teeth 150 (as illustrated in FIG. 3), and a second portion 152 coupled to the first extension portion 140 having mating second teeth 154 (as illustrated in FIG. 3). The first and second teeth 150 and 154 of the first and second portions 148 and 152, respectively, of the angular adjustment 146 mate with one another to allow adjustment of the position of the gripping portion 144.

Figure 1:
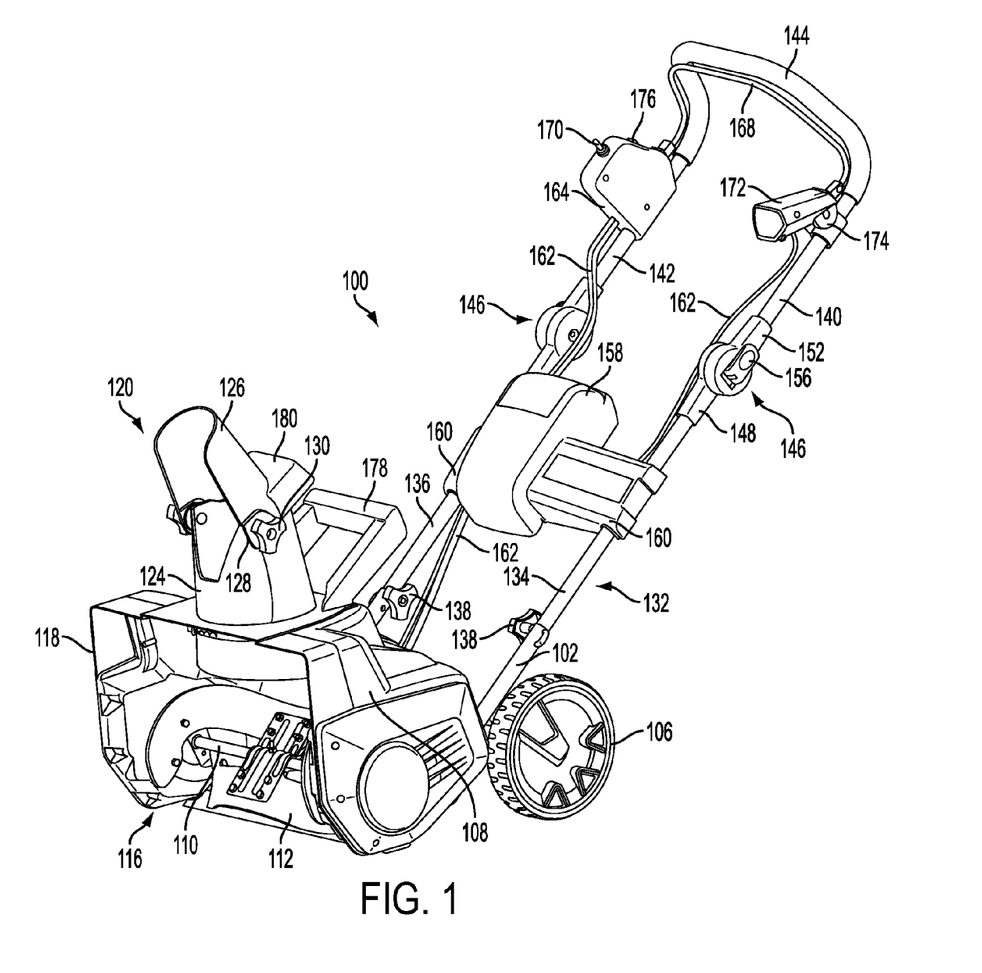
FIG. 1 illustrates a perspective view of a cordless snow thrower.
Figure 2:
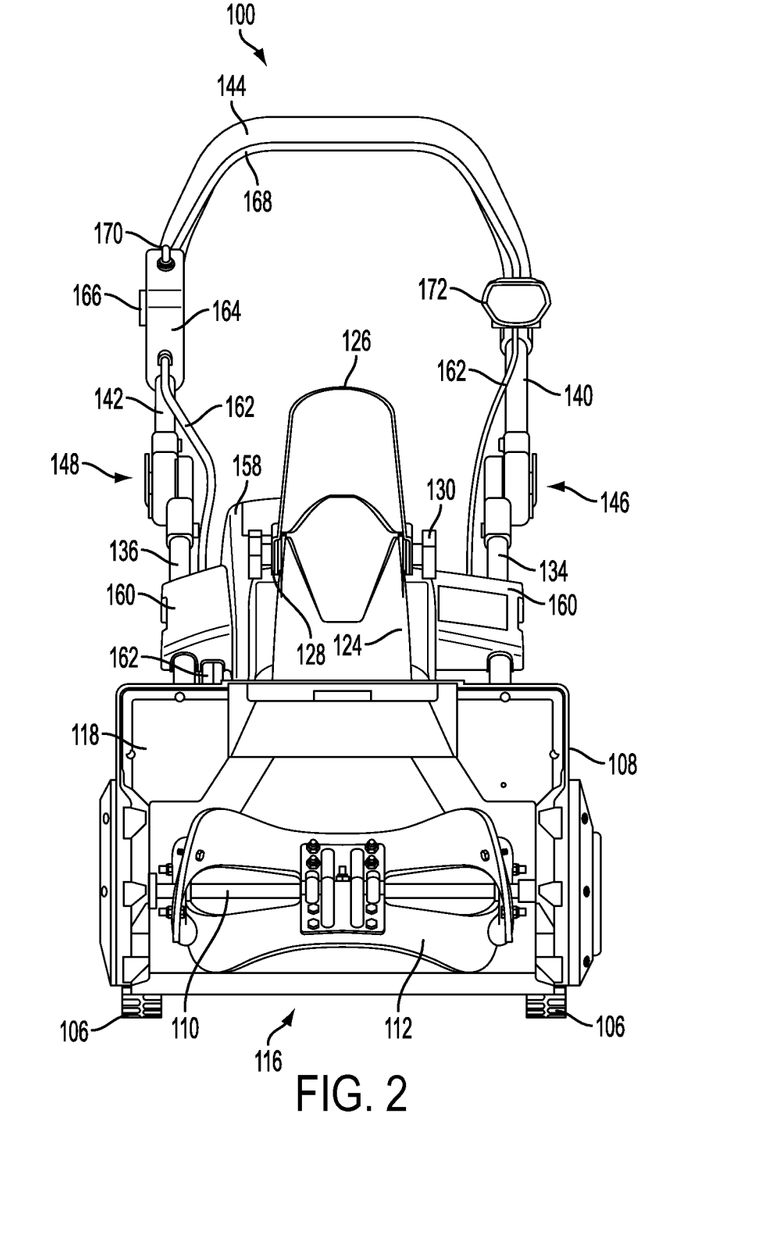
FIG. 2 illustrates a first-side elevation view of the cordless snow thrower.

The angular adjustments 146 may also include a latch 156. The latch 156 when positioned in a latching position (as illustrated in FIG. 1) compresses the first portion 148 and the second portion 152 of the angular adjustment 146 together. To adjust the angular position, the latch 156 is moved to an unlatched position, which allows the first portion 148 and the second portion 152 to rotate with respect to one another. Thus, to adjust the angular position, a user merely positions the latch 156 in the unlatched position, rotates the first portion 148 and the second portion 152 with respect one another to a desired position, and positions the latch 156 in the latched position causing the first and second teeth 150 and 154 of the first and second portions 148 and 152 to engage each other and hold the desired position.

In some embodiments, the handle portion 132 may be a single monolithically formed piece that includes the first member 134, the second member 136, the first extension portion 140, the second extension portion 142, and the gripping portion 144.

A battery housing 158, separate and distinct from the main housing 108, is coupled to the handle portion 132 between the gripping portion 144 and the point of coupling of the handle portion 132 to the frame portion 102. As illustrated, the battery housing 158 is coupled to the handle portion 132 between the point of coupling of the handle portion 132 to the frame portion 102 and the angular adjustment(s) 146 of the handle portion 132. However, the battery housing 158 may be coupled to the handle portion 132 at varying locations along the handle portion 132.

The battery housing 158 is disposed on an opposite side of a pivot point extending through the wheel axle 104 from the main housing 108. This placement provides balance to the cordless snow thrower 100, and reduces the risk of the cordless snow thrower 100 falling or tipping over during use and storage. The placement of the battery housing 158 may also provide ease of tilting and maneuverability of the cordless snow thrower 100 to clear snow and other debris from a surface during operation. The placement of the battery housing 158 also allows for the electrical connection of the various electrical devices of the cordless snow thrower 100, which are located at different positions on the cordless snow thrower 100, for example, the electrical motor(s), the start switch 166 (illustrated in FIG. 4), the control member 170, the light switch 176, etc.

In an illustrative embodiment, the battery housing 158 includes brackets 160 that couple the battery housing 158 to opposing parts, for example, the first and second members 134 and 136 of the handle portion 132. The battery housing 158 may be constructed of any suitable material, for example, plastics, polymers, metals, and other materials. The battery housing 158 protects and shields the components housed in the battery housing 158 from damage and contact with water, snow, dust and other environmental related factors.

In an illustrative embodiment, the battery housing 158 houses one or more batteries capable of powering the cordless snow thrower 100. In one embodiment, the battery is a forty volt (40 V) rechargeable Lithium Ion battery having about 2.2 to about 4.4 ampere hour (Ah). However, it should be appreciated that other batteries may be used that are sufficient to power the cordless snow thrower 100.

The battery housing 158 may house electrical components and circuitry for electrically connecting and providing power to the electrical devices of the cordless snow thrower 100. For example, the battery housing 158 may include one or more switches, switchboards, actuators such as solenoids, resistors, capacitors, conductors, electrical busses, or other electrical components. The battery housing 158 may include a battery power indicator disposed on an outer surface of the battery housing 158. For example, the battery housing 158 may include indicator lights, such as light-emitting diodes (LEDs) that indicate to the operator or user a level of power remaining in the battery. The battery housing 158 may also include one or more electrical connections for electrically connecting additional electrical devices to the cordless snow thrower 100. For example, the battery housing 158 may include one or more electrical connections for electrically connecting a horn, additional lights, audio components, or other electrical devices.

In an embodiment, the battery housing 158 includes a power inlet port electrically connected to the battery. The power inlet port receives a corresponding wired power connector that electrically connects to an external power source, for example, a wall outlet, for charging the battery. In another embodiment, the battery is removable from the battery housing 158 and electrically connects to a wired power charging station that electrically connects to an external power source for charging the battery. In some embodiments, both charging options may be incorporated into the cordless snow thrower 100. For example, the battery housing 158 may include the power inlet port and the battery may be removable from the battery housing 158 for charging. In one embodiment, the battery takes about 1.5 hours to fully charge when the battery is a 2.2 Ah battery, and about 3 hours to fully charge when the battery is a 4.4 Ah battery.

The battery provides power to the electric motor that operates the auger assembly. The electric motor is electrically connected to the battery through one or more electrical connections, for example, the shut-off mechanism 114 and wiring 162 extending into the main housing 108 and to the electric motor. In an aspect, the wiring 162 may be included in or extend along at least a portion of an interior of the handle 132, into the shut-off mechanism 114 and to the electric motor that operates the auger assembly.

Figure 4:
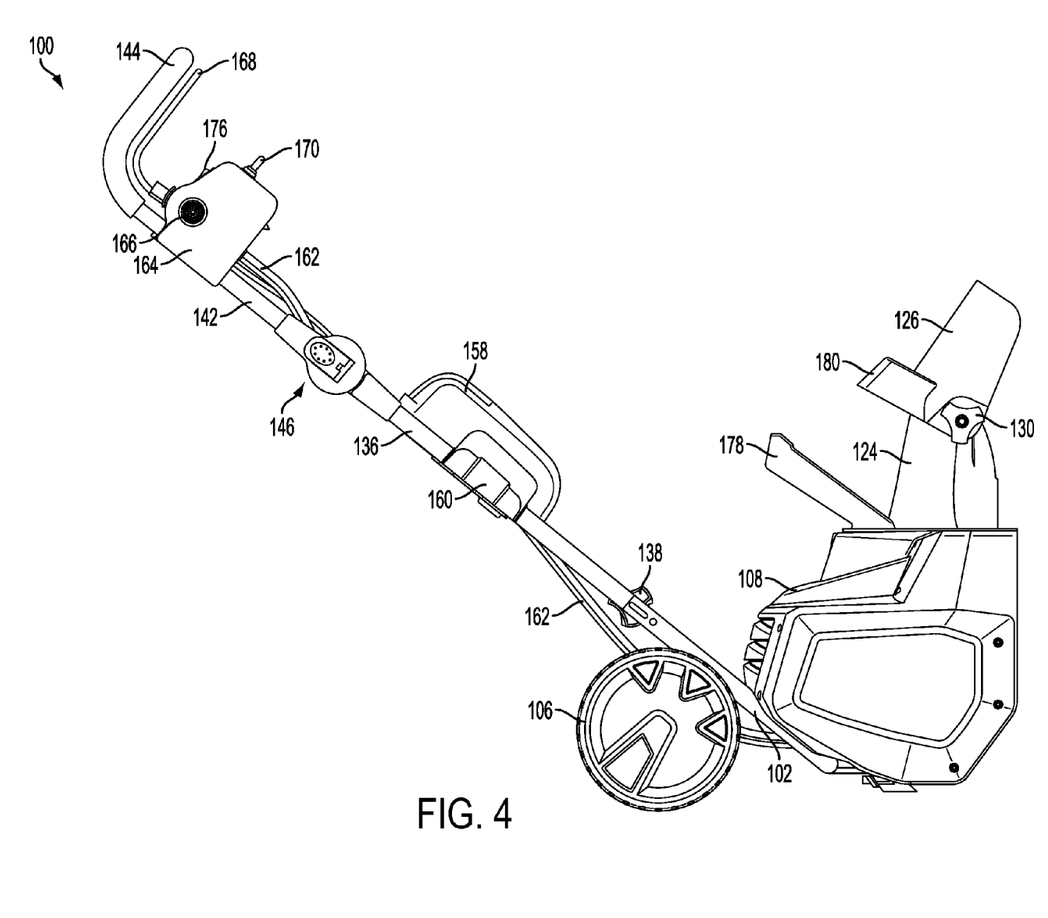
FIG. 4 illustrates a third-side elevation view of the cordless snow thrower.
Figure 5:
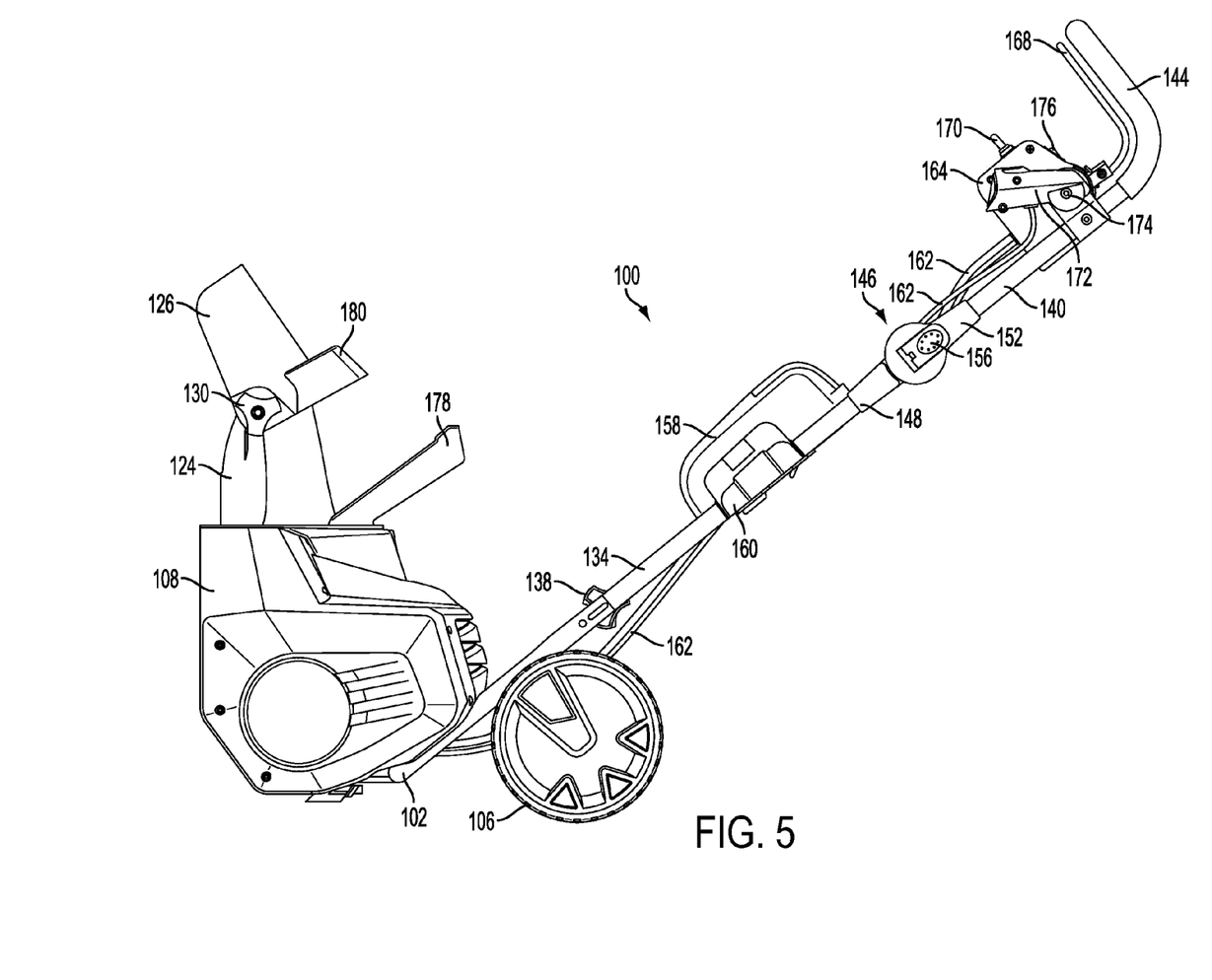
FIG. 5 illustrates a fourth-side elevation view of the cordless snow thrower.

A control housing 164 is coupled to the handle portion 132 proximal to the gripping portion 144 to allow an operator or user to easily access the control housing 164 during operation of the cordless snow thrower 100. In an illustrative embodiment, the control housing 164 houses a start switch 166 (as illustrated in FIG. 4) that is accessible by the user through an aperture of the control housing 164.

An activation member 168 is coupled to the start switch 166 and extends through the control housing 164 and along at least a portion of the gripping portion 144. The start switch 166 and activation member 168 are electrically connected to the battery and the electric motor, for example, through wiring 162 extending from the control housing 164. The start switch 166 and activation member 168 cooperate with one another to control the flow of power from the battery to the electric motor that controls the auger assembly. For example, a user may push the start switch 166 and hold the activation member 168 adjacent the gripping member 144 to cause power to be supplied to the electric motor and rotate the auger blade(s) 112.

As illustrated in FIGS. 3 and 6, the wiring 162 extends from the control housing 164, into the shut-off mechanism 114, and into the electric motor in the main housing 108. In general, the shut-off mechanism 114 allows power to be supplied to the electric motor and rotate the auger blade(s) 112 when the activation member 168 is held adjacent the gripping member 144. However, when the cordless snow thrower 100 is rolled backwards, the shut-off mechanism 114 turns off power supplied to the electric motor ceasing rotation of the auger blade(s) 112 even while the activation member 168 is held adjacent the gripping member 144.

In an illustrative embodiment, the main housing 108 also houses an electric motor that rotates the substantially cylindrical tube portion 124 with respect to the main housing 108. The electric motor may also rotate the substantially semi-circular tube portion 126 with respect to the substantially cylindrical tube portion 124. The electric chute motor is electrically connected to the battery, for example through wiring 162. In this embodiment, the control housing 164 also houses a control member 170, for example, illustrated as a joystick, that extends from the control housing 164. The control member 170 is electrically connected to the battery and the electric chute motor, for example, through wiring 162. The control member 170 controls the rotation of the substantially cylindrical tube portion 124 with respect to the main housing 108 allowing a user to manipulate a direction snow is being thrown by the cordless snow thrower 100. For example, movement of the control member 170 or joystick in a rightward direction may cause the substantially cylindrical tube portion 124 to rotate in a rightward direction with respect to the main housing 108, and movement of the control member 170 in a leftward direction may cause the substantially cylindrical tube portion 124 to rotate in a leftward direction with respect to the main housing 108.

A motor electrically connected to the battery may also be included in the housing 108 that rotates the substantially semi-circular tube portion 126 with respect to the substantially cylindrical tube portion 124. The control member 170 or joystick may also be electrically connected to this motor to control the rotation of the substantially semi-circular tube portion 126 with respect to the substantially cylindrical tube portion 124. For example, movement of the joystick in an upward direction may cause the substantially semi-circular tube portion 126 to rotate in an upward direction with respect to the substantially cylindrical tube portion 124, and movement of the joystick in a downward direction may cause the substantially semi-circular tube portion 126 to rotate in a downward direction with respect to the substantially cylindrical tube portion 124.

In an illustrative embodiment, a light 127 may be coupled to the handle portion 132 proximal to the gripping portion 144. As illustrated, the light 172 is coupled to an opposing portion of the handle portion 132 with respect to the control housing 164, however, the light 172 and the control housing 164 may be positioned in other locations on the handle portion 132 or on another portion of the cordless snow thrower 100, such as the main housing 108. The light 172 may also include a pivotable and/or rotatable joint 174 to allow the light 172 to pivot and/or rotate with respect to the handle portion 132 to allow the user or operator to position the light in a desired direction. The light 172 allows for the use and operation of the cordless snow thrower 100 when daylight or ambient light is low. The light 172 is electrically connected to the battery through wiring 162 extending from the light 172. The light may be any suitable light source, for example, a halogen light or other type of light.

A light on/off switch 176 may be electrically connected to the light 172. As illustrated, the light switch 176 is disposed on and housed by the control housing 164 and electrically connected to the light through wiring 162. The wiring 162 electrically connects the light 172, the light switch 176, and the battery, to allow the user to turn the light 172 on and off. In this manner, the user can turn or leave the light 172 in an off position to conserve battery power when the cordless snow thrower 100 is being used in daylight.

In an illustrative embodiment, the main housing 108 may include a first handle 178 disposed on a top portion of the main housing 108 for carrying, lifting, and moving the cordless snow thrower 100 when it is not being operated or used. The substantially semi-circular tube portion 126 may include a second handle 180 for use by the operator or user in manually rotating the substantially semi-circular tube portion 126 with respect to the substantially cylindrical tube portion 124.

Figure 7:
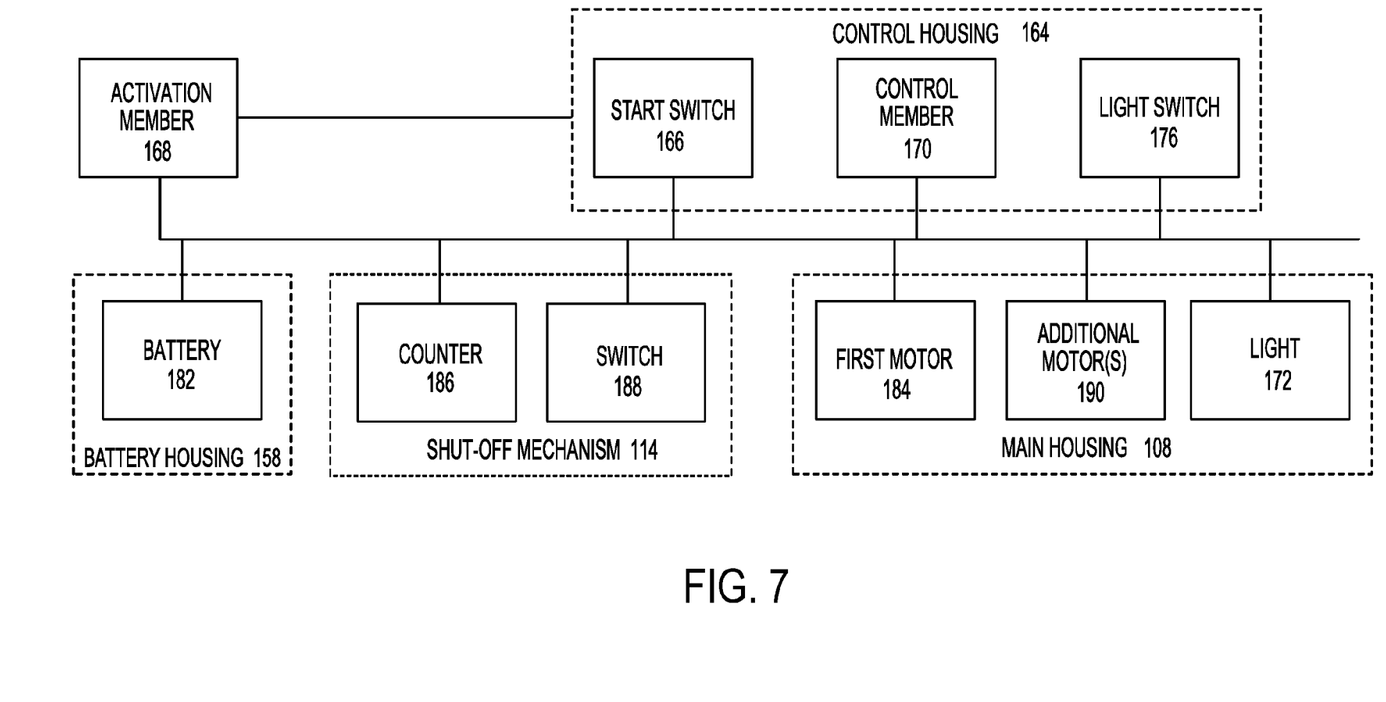
FIG. 7 illustrates a functional block diagram of components of the cordless snow thrower.

A functional block diagram of electrical devices and components of the cordless snow thrower 100 is described with reference to FIG. 7. As illustrated, a battery 182, which is disposed in the battery housing 158, is electrically connected to the start switch 166, the activation member 168, the control member 170, the light switch 176, the light 172, a first motor 184, a counter 186, a switch 188, and optionally one or more additional motors 190.

The first motor 184 is disposed in the main housing 108 and may control the rotor or auger assembly by rotating the rotor shaft 110. The start switch 166 and the activation member 168 may control activation of power being supplied to the first motor 184. For example, upon an operator activating the start switch 166 and the activation member 168, voltage may be supplied from the battery 182 to the first motor 184. Similarly, upon release of the activation member 168 by the operator, voltage supplied from the battery 182 to the first motor 184 may be deactivated or turned off.

The counter 186 and the switch 188 may be housed in the shut-off mechanism 114 and may control activation of power being supplied to the first motor 184 when the start switch 166 and the activation member 168 are activated. For example, as described above, the shut-off mechanism 114 is configured to automatically deactivate voltage supplied from the battery 182 to the first motor 184 when the cordless snow thrower 100 rolls or is rolled in a backwards direction. The counter 186 may count the number of rotations of the wheel axle 104 and/or the wheels 106 in the backwards or reverse direction and the switch 188 may deactivate voltage supplied from the battery 182 to the first motor 184 when the number or rotations meets or exceeds a threshold value, for example, one, two, three, four, five, etc. rotations.

The shut-off mechanism 114, for example, the switch 188, may also reactivate the voltage supplied from the battery 182 to the first motor 184 when the cordless snow thrower 100 is being rolled in a forward direction and/or being used to clear snow or other debris. In this aspect, the shut-off mechanism 114 detects when the wheel axle 104 and/or the wheels 106 is being rotated in the forwards direction and upon detecting such rotation allows voltage to be supplied from the battery 182 to the first motor 184.

The first motor 184 may also control the rotation of the substantially cylindrical tube portion 124 with respect to the main housing 108 and/or the rotation of the substantially semi-circular tube portion 126 with respect to the substantially cylindrical tube portion 124. Alternatively, one or more additional motors 190 may be disposed in the main housing 108 and control the rotation of the substantially cylindrical tube portion 124 with respect to the main housing 108 and/or the rotation of the substantially semi-circular tube portion 126 with respect to the substantially cylindrical tube portion 124.

The control member 170 may control activation of power being supplied to the first motor 184 or the one or more additional motors 190 to move the chute. For example, in response to the operator moving the control member 170, voltage may be supplied from the battery 182 to the first motor 184 or the one or more additional motors 190 and the substantially cylindrical tube portion 124 or the substantially semi-circular tube portion 126 may rotate.

The light 172 may be controlled by the light switch 176. For example, in response to the operator placing the light switch 176 in an on position, voltage may be supplied from the battery 182 to the light 172. Similarly, in response to the operator placing the light switch 176 in an off position, voltage supplied from the battery 182 to the light 172 may be deactivated or turned off.

As described above, one or more electrical components, for example, switches, switchboards, actuators such as solenoids, resistors, capacitors, conductors, electrical busses, or other electrical components may be included in the battery housing 158 or the main housing 108 and electrically connected to the battery 182 and/or one or more of the electrical devices of the cordless snow thrower 100.

The electrical devices and other electrical components may be electrically connected or wired in a number of different ways known to those having ordinary skill in the art. For example, the electrical devices may be electrically connected through one or more electrical busses disposed in the battery housing 158. In one embodiment, the start switch 166 and the activation member 168 may be electrically connected to the battery 182, the shut-off mechanism 114, and the electric motor 184 through an actuator, for example a solenoid.

Although the device has been described and illustrated in connection with certain embodiments, many variations and modifications will be evident to those skilled in the art and may be made without departing from the spirit and scope of the disclosure.

For example, as illustrated and described, the snow thrower is a cordless snow thrower; however, it should be appreciated that the reverse shut-off mechanism may be implemented in any type of snow thrower, such as, an electric snow thrower, or a gas or other fuel powered snow thrower to conserve power and/or fuel consumption, respectively.

Further, as illustrated and described, the cordless snow thrower is a single-stage snow thrower, meaning that the snow thrower is a push drive device. However, it should be appreciated that the cordless snow thrower may be a multi-stage snow thrower and include a drive motor electrically connected to the battery to rotate the wheels.

The disclosure is thus not to be limited to the precise details of methodology or construction set forth herein as such variations and modification are intended to be included within the scope of the disclosure. Moreover, unless specifically stated any use of the terms first, second, etc. do not denote any order or importance, but rather the terms first, second, etc. are merely used to distinguish one element from another.

What is claimed is:

1. A snow thrower, comprising:
   a frame;
   a main housing coupled to the frame and having an inlet cavity;
   an auger assembly disposed in the main housing and extending across the inlet cavity;
   a motor disposed in the main housing and coupled to the auger assembly, the motor adapted to rotate the auger assembly;
   a wheel assembly coupled to the frame and including an axle and wheels coupled to ends of the axle for rolling the snow thrower;
   a shut-off mechanism coupled to the wheel assembly and adapted to:
      count a number of rotations of the wheels in a reverse direction, and
      deactivate power to the motor in response to the number of rotations meeting or exceeding a threshold number of rotations.

2. The snow thrower of claim 1, further comprising a handle portion coupled to the frame opposite the main housing, and wherein the wheel assembly is coupled to the frame between the main housing and the handle portion.

3. The snow thrower of claim 2, further comprising a battery housing coupled to the handle portion; and a battery disposed in the battery housing and electrically connected to the motor through the shut-off mechanism.

4. The snow thrower of claim 3, wherein the battery housing and the main housing are positioned on opposite sides of a pivot point formed by the axle.

5. The snow thrower of claim 4, further comprising a switch electrically connected to the battery and the motor and adapted to activate and deactivate voltage flow from the battery to the motor.

6. The snow thrower of claim 5, wherein the shut-off mechanism is adapted to interrupt and deactivate the voltage flow from the battery to the motor in response to the wheel assembly being rotated in the reverse direction.

7. The snow thrower of claim 6, wherein the shut-off mechanism is adapted to reactivate the voltage flow from the battery to the motor in response to the wheel assembly being rotated in a forward direction.

8. The snow thrower of claim 1, wherein the threshold number of rotations is at least two.

9. A snow thrower, comprising:
   a frame;

a main housing coupled to the frame and having an inlet cavity;

an auger assembly disposed in the main housing and extending across the inlet cavity;

a motor disposed in the main housing and coupled to the auger assembly, the motor adapted to rotate the auger assembly;

a wheel assembly coupled to the frame and including an axle and wheels coupled to ends of the axle for rolling the snow thrower; and a shut-off mechanism coupled to the wheel assembly and including:
- a counter adapted to count a number of rotations of the wheels in the reverse direction; and
- a switch adapted to deactivate power to the motor in response to the number of rotations meeting or exceeding a threshold number of rotations.

10. The snow thrower of claim 9, wherein the threshold number of rotations is at least two.

11. The snow thrower of claim 9, wherein the switch is adapted to reactivate the power to the motor in response to the wheels being rotated in a forward direction.

12. The snow thrower of claim 9, further comprising a handle portion coupled to the frame opposite the main housing.

13. The snow thrower of claim 12, further comprising a battery housing coupled to the handle portion; and a battery disposed in the battery housing and electrically connected to the motor through the shut-off mechanism.

14. The snow thrower of claim 13, wherein the battery housing and the main housing are positioned on opposite sides of a pivot point formed by the axle.

15. A method of making a snow thrower, comprising:

coupling a shut-off mechanism including a counter to a wheel axle of a snow thrower;

electrically coupling the shut-off mechanism between a power source and a motor adapted to rotate an auger assembly of the snow thrower; and allowing the shut-off mechanism to interrupt and deactivate power to the motor in response to the counter indicating that the wheel axle rotated at least two revolutions in a reverse direction.

16. The method of claim 15, further comprising allowing the shut-off mechanism to reactivate the power to the motor in response to the wheel axle rotating in a forward direction.

17. The method of claim 16, further comprising allowing the shut-off mechanism to reactivate the power to the motor in response to the wheel axle rotating at least one revolution in a forward direction.

18. The method of claim 17, wherein the power source is a battery power source.

* * * * *